United States Patent [19]
Reinhardt et al.

[11] Patent Number: 5,745,375
[45] Date of Patent: Apr. 28, 1998

[54] APPARATUS AND METHOD FOR CONTROLLING POWER USAGE

[75] Inventors: Dennis Reinhardt, Palo Alto; Ketan Bhat, Mountain View; Robert T. Jackson; Borys Senyk, both of San Jose; Eugene P. Matter; Stephen H. Gunther, both of Folsom, all of Calif.

[73] Assignee: Intel Corporation, Santa Clara, Calif.

[21] Appl. No.: 537,146

[22] Filed: Sep. 29, 1995

[51] Int. Cl.[6] .................................................. H02J 03/16
[52] U.S. Cl. .................................. 364/492; 395/750
[58] Field of Search ........................... 364/492, 707; 395/750; 136/290, 293; 320/30, 43

[56] References Cited

U.S. PATENT DOCUMENTS 4,238,784 12/1980 Keen et al. ........................... 341/126
5,254,992 10/1993 Keen et al. ........................... 341/119

*Primary Examiner*—Ellis B. Ramirez
*Assistant Examiner*—Thomas Peeso
*Attorney, Agent, or Firm*—Blakely, Sokoloff, Taylor & Zafman

[57] ABSTRACT

A power control circuit and corresponding technique for reducing power consumption by an electronic device and thereby increasing performance. The power control circuit comprises a controller, a clock generation circuit and a power supply circuit. The controller detects whether a condition exists to scale the voltage and frequency of the electronic device and in response, signals the clock generation circuit to perform frequency scaling on the electronic device and the power supply circuit to perform voltage scaling on the electronic device. The condition may include a situation where the temperature of the electronic device is detected to have exceeded a thermal band. The condition may also include a situation where the electronic device is detected to be idle for a selected percentage of its run time.

33 Claims, 4 Drawing Sheets

APPARATUS AND METHOD FOR CONTROLLING POWER USAGE

BACKGROUND OF THE INVENTION

1. Field of the Invention

The present invention relates to the field of electronic devices. More particularly, the present invention relates to reducing power consumption by an electronic device through voltage and frequency scaling.

2. Description of Art Related to the Invention

Over the last few years, there have been many advances in semiconductor technology which have resulted in the development of improved electronic devices having integrated circuits operating at higher frequencies and supporting additional and/or enhanced features. While these advances have enabled hardware manufacturers to design and build faster and more sophisticated hardware products (e.g., computers, peripheral devices, etc.), they have also imposed a disadvantage primarily experienced by battery-powered laptop or notebook style computers. In particular, these improved electronic devices consume more power and dissipate more heat as a by-product than those past generation electronic devices.

It is well-known that modern battery-powered laptop computers place a high premium on reducing power consumption because such reduction extends its battery life. Currently, one primary technique to reduce power consumption of laptop computers is to lower the frequency of the clocking signal supplied to one of its electronic devices, namely its central processing unit ("CPU"). This technique (referred to herein as "frequency reduction") usually is accomplished by dividing the clocking signal supplied to the CPU (i.e., the CPU clock) or, in the alternative, halting the clocking signal for brief time intervals so that the average operating frequency is reduced.

Referring to FIG. 1, a graph illustrating power savings realized by any electronic device based on the conventional frequency reduction technique is shown. It is well-known that electronic devices, in general, are designed to operate within a specific voltage range. This frequency range 10 is represented as being between points A and B, where point A represents the minimum frequency required for the electronic device to operate and point B represents the maximum frequency that the electronic device can support. In theory, power is directly proportional to frequency as presented herein. Thus, as shown through points C and D, a reduction in the operating frequency of the electronic device by ten percent (10%) will reduce its total power consumption by ten percent (10%) from P1 to P2. Of course, true power savings are not exactly proportional to frequency reduction because most every hardware product is implemented with electronic devices which consume power but are frequency-independent (e.g., displays for computer systems).

This conventional frequency reduction technique imposes a number of disadvantages. One paramount disadvantage is that the frequency reduction offers minimal conservation of battery life because the amount of energy required by the electronic device undergoing frequency reduction to perform a certain task can remain constant. In some situations, depending on the chosen configuration between frequency-dependent and frequency independent devices within a product like a laptop computer, frequency reduction may adversely effect battery life conservation. This is largely due to the fact that the electronic device, while operating at a slower frequency, requires extra operating time to complete the task. As a result, this extra operating time causes the frequency-independent devices within the product to consume more energy which, in some cases, will exceed any energy savings realized by reduced the operating frequency of the electronic device.

Hence, it is desirous to create a power control circuit and develop a technique for reducing power consumption which can be utilized by any type of electronic device, especially microprocessors, to more effectively reduce its power consumption without substantially mitigating performance.

Another advantage provided by the power control circuit is that it encourages the implementation of full-frequency, full-voltage electronic devices within power sensitive hardware products rather than configuring the electronic device to function if a worst-case condition occurs. Instead, the electronic device relies on voltage and frequency scaling to dynamically configure the electronic device based on its various conditions at the time. Thus, the overall performance of the product implementing the electronic device is enhanced.

Yet another advantage is to enable companies to reduce their inventories of electronic devices dedicated to either laptop or desktop systems by eliminating the need for electronic devices calibrated to have a specific voltage and operating frequency, but rather dynamically calibrating the voltage and frequency of the electronic device based on the current conditions experienced by the electronic device.

BRIEF SUMMARY OF THE INVENTION

The present invention relates to a power control circuit and a technique for, among other things, reducing power consumption by an electronic device. The power control circuit comprises a controller, a clock generation circuit and a power supply circuit. The controller, governed by power management software, signals the power supply circuit and the clock generation circuit to perform voltage and frequency scaling on the electronic device, provided at least one of two conditions occurs. For example, a first condition is where the temperature of the electronic device is detected to have exceeded a thermal band. A second condition is where the electronic device is detected to be idle for a selected percentage of power-on time.

BRIEF DESCRIPTION OF THE DRAWINGS

The features and advantages of the present invention will become apparent from the following detailed description of the present invention in which.

DETAILED DESCRIPTION OF THE INVENTION

The present invention describes a system and method for controlling power consumption of at least one electronic device through both voltage and frequency scaling. The following detailed description is presented largely in terms of graphs, block diagrams and a flowchart which collectively illustrate the present invention in detail but does not discuss well-known circuits or process steps to avoid unnecessarily obscuring the present invention. The flowchart illustrates a series of steps leading to a desired result. These steps require physical manipulations of physical quantities in the form of electrical or magnetic signals capable of being stored, transferred, combined, compared or otherwise manipulated.

Figure 2A:
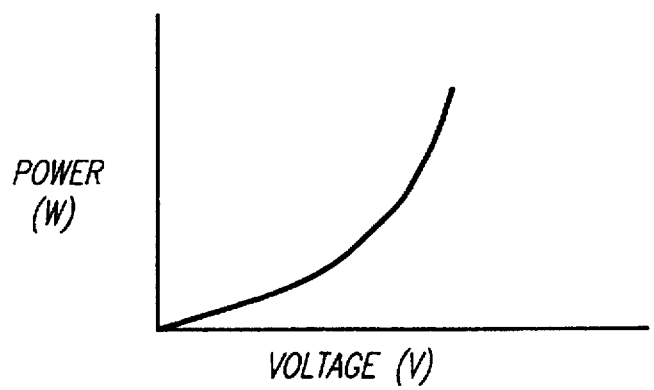
FIG. 2a is an illustrative diagram of the theoretical "squared" relationship between voltage and power.

Referring to FIG. 2a, an illustrative graph of the relationship between voltage and power is shown. As noted in Equations 1 and 2 below, valid for many electronic devices (e.g., CMOS), theoretically, power has a "squared" law dependence with voltage which, in turn, has a generally proportional relationship with the operating frequency.

Equation 1:
Power $= C \times V^2 \times F \times Act$, where

"C"=total capacitance of the electronic device;
"V"=total voltage supplied to the electronic device;
"F"=operating frequency of the electronic device; and
"Act"=percentage of gates of the electronic devices changing state for a given clock cycle.

Equation 2:
V$\alpha$F, where $V_1 \geq V \geq V_2$ and $V_1$ is the maximum operating voltage supported by the electronic device, and
V$\alpha$(k×F), where $V_2 \geq V \geq V_3$ where "k" is a constant less than one when voltage scaling is performed outside a voltage range defined below.

Equation 2 is a linearized approximation.

Thus, according to Equation 1, a ten percent decrease (10%) in voltage constitutes a nineteen percent (19%) decrease in power since $C \times (0.90V)^2 \times F \times Act = (0.81) \times Power$.

Figure 1:
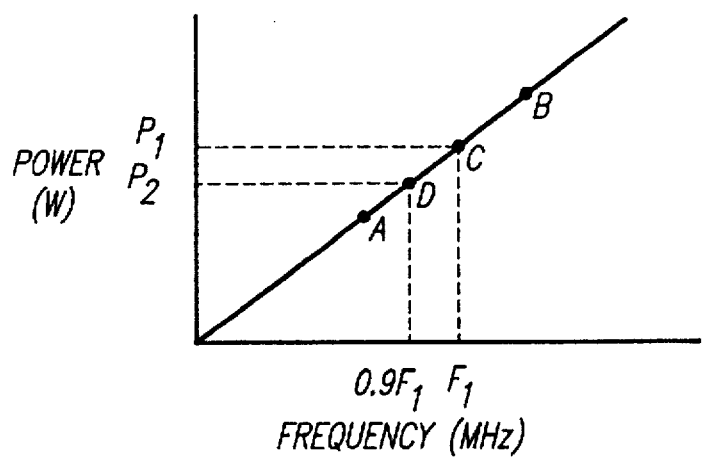
FIG. 1 is an illustrative diagram of theoretical power savings realized by a conventional frequency reduction technique.
Figure 2B:
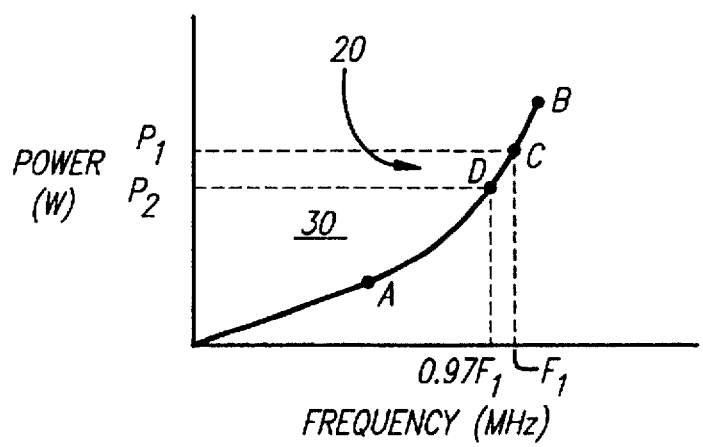
FIG. 2b is an illustrative diagram of power savings realized by an electronic device which is controlled through voltage and frequency scaling as provided by the present invention.

Referring now to FIG. 2b, an illustrative graph of the power saving realized by an electronic device by performing combined voltage and frequency scaling is shown. Similar to FIG. 1, the electronic device is operational within a voltage range 20 which is defined between point A (minimum operating voltage of the electronic device) and point B (maximum operating voltage). Furthermore, to be consistent with FIG. 1, points C and D represent the operational frequency of the electronic device at power levels P1 and P2, respectively. Thus, in the present invention, by decreasing the operational frequency and voltage of the electronic device (at point C) by slightly more than three percent (to point D), the power consumed by the electronic device is decreased by approximately ten percent (10%) since $C \times (0.966V)^2 \times (0.966F) \times Act = (0.901) \times Power$.

Clearly, while the realized power savings is generally equivalent to that obtained through the conventional frequency reduction technique, the operating frequency of the electronic device has diminished only three percent (3%) rather than ten percent (10%). It is contemplated that voltage and frequency scaling may occur in the voltage range 20, however only frequency scaling may occur for the electronic device along a low-voltage range 30 up to point A. This is due to the fact that voltage scaling in the low-voltage range 30 would cause the electronic device to become inoperative.

Figure 3:
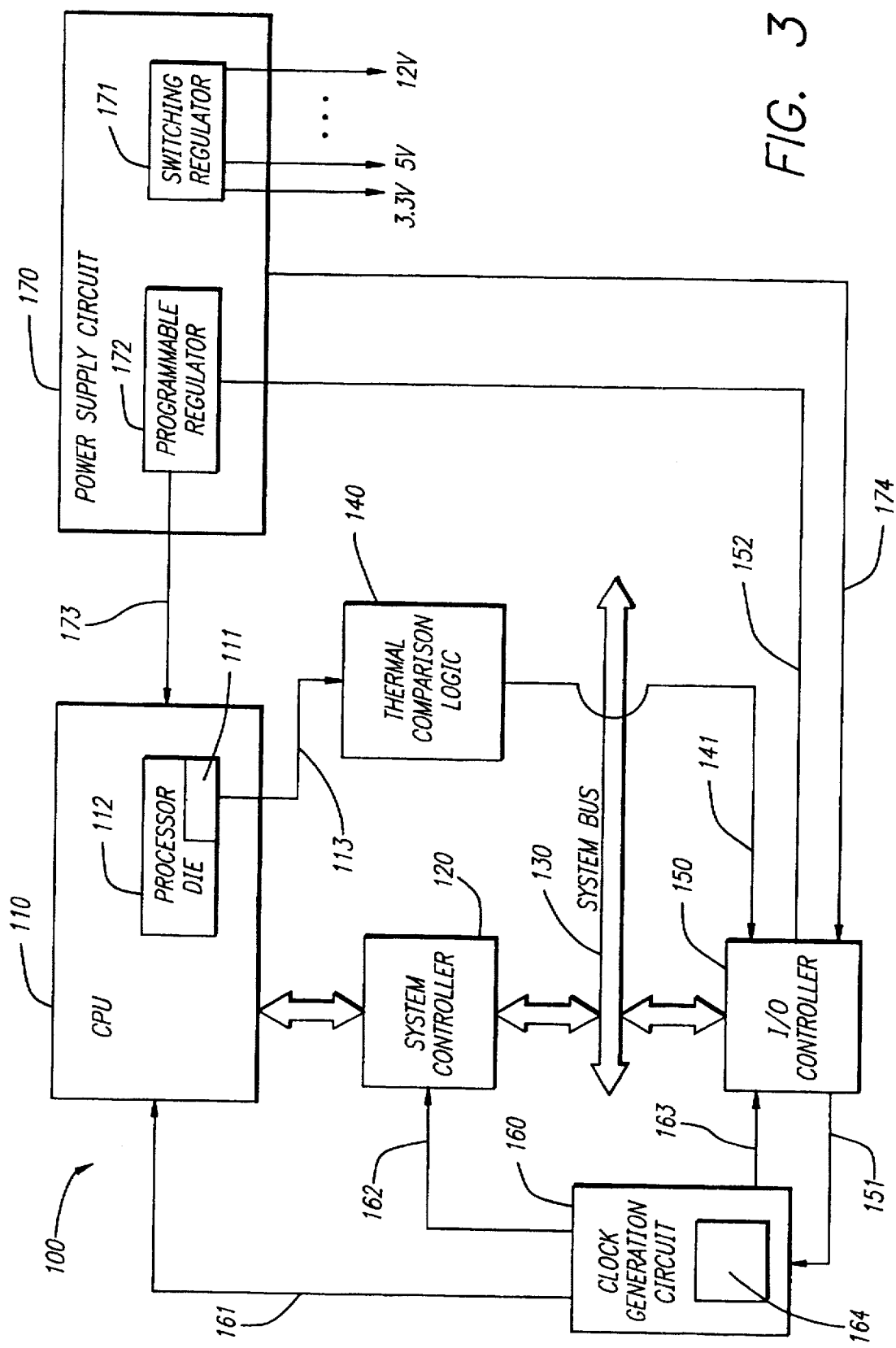
FIG. 3 is an illustrative block diagram of a power control circuit of the present invention employed within a standard computer system including an input/output ("I/O") controller, a clock generation circuit and a power supply circuit.

Referring to FIG. 3, one embodiment of a power control circuit employed within a computer system to control power consumption by an electronic device (e.g., a microprocessor) is illustrated. Although the electronic device is shown as a microprocessor because of its reputation of being one of the main power consuming chips within a computer system, the power control circuit is capable of controlling power consumption by other types of electronic devices such as controllers.

The computer system 100 comprises a central processing unit ("CPU") 110, a system controller 120, a system bus 130, thermal comparison logic 140, an input/output ("I/O") controller 150, a clock generation circuit 160 and a power supply circuit 170. After the computer system is powered-on and the user has selected a software application from main memory, mass storage memory device (e.g., IDE device) or an external disk drive to perform a certain task, the I/O controller 150 is configured by thermal management software stored within the CPU 110 to facilitate voltage and frequency scaling of the CPU 110 if at least one of two conditions occurs; namely, the temperature of the CPU 110 exceeds a thermal band or the CPU 110 is experiencing excessive idle time. The "thermal band" is represented by an absolute hardware limit (requiring immediate device shut-off if exceeded) and programmable software upper and lower limits. These software limits represent thermal limits where, if exceeded, "throttling" (i.e., decreasingly scale voltage and frequency) or "de-throttling" is recommended.

As shown, a temperature sensing component (e.g., thermistor and the like) 111 is coupled to a processor die 112 of the CPU 110 in order to monitor the temperature of the processor die 112 through thermal dissipation results, and to detect when the temperature has exceeded the thermal band. Thereafter, the temperature sensing component 111 transmits an analog signal to the thermal comparison logic 140 via control line 113. The thermal comparison logic 140 receives the analog signal and converts it into a digital signal which is input into the I/O controller 150 via a temperature control line 141. This digital signal, when asserted, indicates to the I/O controller 150 that the CPU 110 is operating at a temperature outside its thermal band. As a result, the I/O controller 150 needs to perform an operation to reduce the temperature of the processor die 112 within the CPU 110.

To reduce the temperature of the processor die 112, the I/O controller 150 programs a register 164 within the clock generation circuit 160 by propagating user-configured, programmable information stored within the I/O controller 150 into the register 164 via control line 151. The programmed information indicates how much (usually in a percentage value) the operating frequency of the clocking signal, supplied to at least the CPU 110 by the clock generation circuit 160 via clock lines 161, is to be altered. In some CPU implementations as shown, the clocking signal utilized by the system bus 130 must bear a fixed relationship with the clocking signal input into the CPU 110 (i.e., CPU clock). As a result, the clocking signals of the system controller 120 and the system bus 130 are reduced in proportion to the CPU clock. The clock generation circuit 160 monitors the value of the register 164 and appropriately modifies the frequency of the clocking signals transferred through clock lines 161–163.

After determining that the operating frequency has been reduced though any well known technique (e.g., signaling, preset delay time, etc.), the I/O controller 150 generates a voltage modification control signal to the power supply circuit 170 via control line 152. The power supply circuit 170 includes a switching regulator 171 and a programmable regulator 172. Although not shown, the power supply circuit 170 includes a sensing circuit to indicate to the I/O controller 150 whether power is provided to the computer system 100 from a wall socket or from a battery source. The programmable regulator 172 receives the voltage modification control signal from the I/O controller 150 which indicates the amount of CPU core voltage, which is transferred to the processor die 112 by the programmable regulator 172 through power line 173, is reduced. The switching regulator 171, however, is unaffected by the voltage modification control signal and continues to provide power (3.3V, 5V, 12V, etc.) to power planes of the computer system 100.

Thus, in order to optimally diminish power consumption by the CPU 110 without disproportionate sacrifice of its speed, the CPU 110 first experiences frequency reduction and then voltage reduction. This order of scaling guarantees that the CPU 110 does not experience failure. However, it is contemplated that de-throttling the CPU 110 (i.e., increasing its voltage and frequency) requires the CPU core voltage to be appropriately increased before the operating frequency is increased.

The second condition, i.e., the CPU is experiencing excessive "idle" time, typically occurs when the computer system 100 is running a software application that does not require optimal performance of the CPU 110 such as, for example, various legacy software applications, word processing programs, etc. Thus, power consumption can be optimally reduced by monitoring the amount of idle time experienced by the CPU 110.

Figure 4:
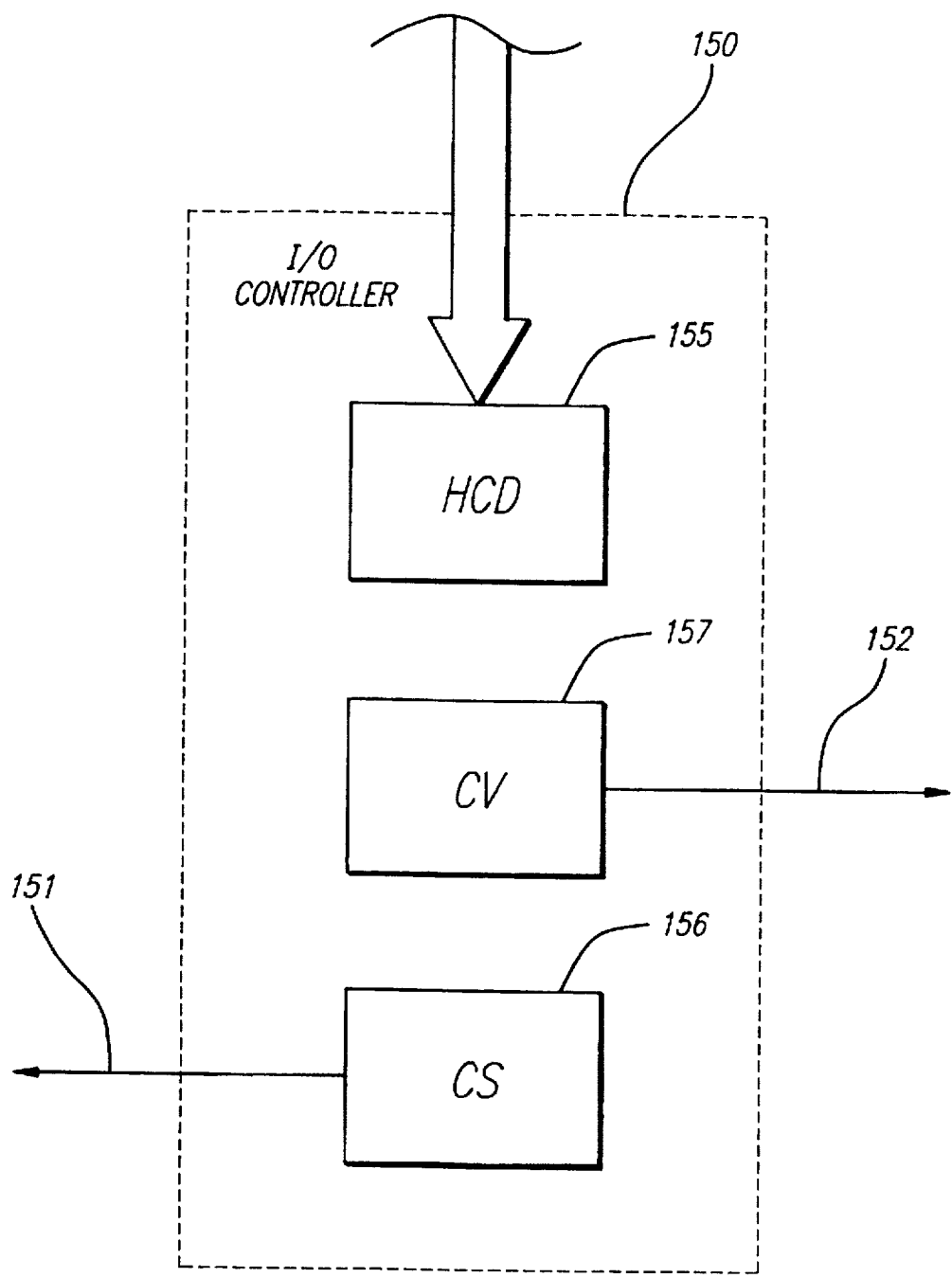
FIG. 4 is an illustrative block diagram of a plurality of registers employed within the I/O controller to store information to enable the clock generation circuit to perform frequency scaling and the power supply circuit to perform voltage scaling.

It is well known in the art that power management software such as Advanced Power Management ("APM") software, which is stored within the main memory of the computer system and operates transparently to the user, monitors whether the CPU 110 is idle or is performing useful computations. When the CPU 110 is idle, the power management software in one implementation generates a HALT instruction and causes the CPU 110 to produce a halt acknowledgment cycle. The halt acknowledgment cycle is propagated through the system controller 120 onto the system bus 130. Upon detecting that the CPU 110 is producing the halt acknowledgment cycle, the I/O controller 150 sets its halt cycle detect ("HCD") storage element as shown in FIG. 4. Thereafter, the power management software periodically scans the HCD storage element and in the event that the HCD storage element is set frequently (e.g., at least approximately five to ten percent 5%–10% of its run time), the computer system is throttled to perform voltage and frequency scaling. In such case, the I/O controller 150 performs the voltage and frequency scaling operations in the same manner as discussed above with respect to the first condition.

Some implementations do not generate a halt instruction but, instead, save power by other means (e.g., frequency scaling). In such cases, the HCD storage element 155 is modified in obvious ways to detect such other means.

Referring now to FIG. 4, an embodiment of the I/O controller 150 is shown. The I/O controller 150 includes the HCD storage element 155, a clock speed ("CS") storage element 156 and a CPU core voltage ("CCV") storage element 157. The HCD storage element 155 preferably is a single bit register indicating dynamically how frequently the CPU is in normal or idle state. More specifically, the HCD storage element 155 is set when the CPU is idle and is reset when the CPU is in its normal operating state. Thus, power management software requests the I/O controller 150 to perform voltage and frequency scaling when the HCD storage element 155 is frequently set and return the CPU to its maximum operating frequency and corresponding voltage when the HCD storage element 155 is frequently reset.

The CS storage element 156 is configured as a "n" bit register ("n" being an arbitrary whole number) to incorporate a frequency slewing constant which is used to throttle the frequency of the CPU. This is accomplished by transferring the frequency slewing constant from the CS storage element 156 into the register 164 of the clock generation circuit. Similarly, the CCV storage element 157 is configured to incorporate a voltage slewing constant which is used to incrementally throttle the CPU core voltage provided by the power supply circuit. The voltage slewing constant is transferred into the programmable regulator of the power supply circuit as shown in FIG. 3.

Figure 5:
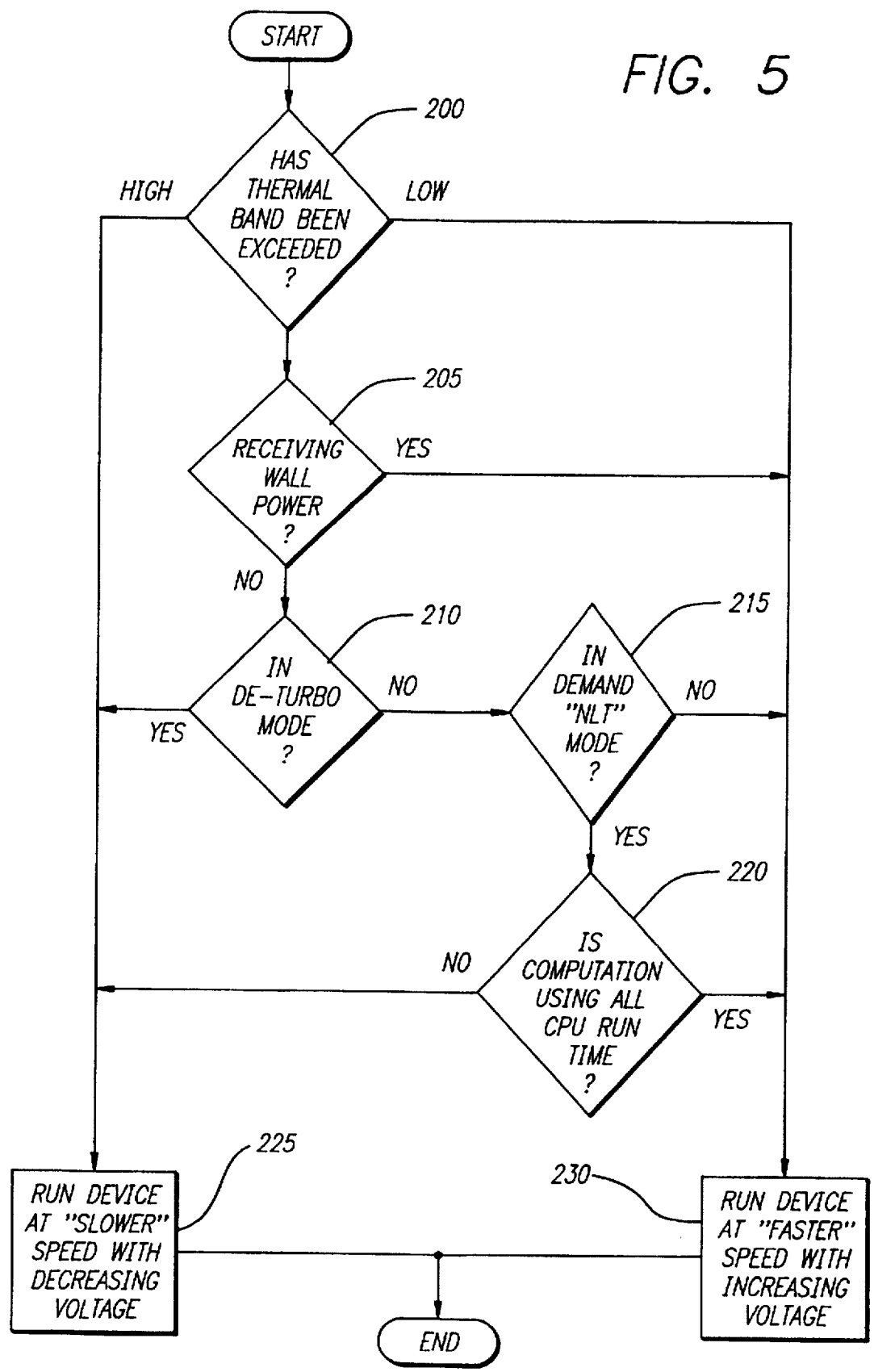
FIG. 5 illustrates the operations performed by the present invention to optimally reduce power consumption by the electronic device through voltage and frequency scaling.

Referring now to FIG. 5, an illustrative flowchart featuring the operational steps of the present invention is shown. In Step 200, the temperature of the electronic device is monitored to ascertain whether it has exceeded the thermal band. If the predetermined thermal threshold has been exceeded, the electronic device undergoes both voltage and frequency scaling to reduce its power consumption (Step 225) or if the imposed low thermal band is exceeded, the device is capable of operating at a higher voltage and frequency. If the electronic device has not exceeded its thermal band, a determination is made as to whether the electronic device is receiving alternating current ("AC") power from a conventional wall socket or is receiving direct current ("DC") power through a battery power supply (Step 205). If the electronic device is receiving power from the conventional wall socket, no voltage and frequency scaling is performed on the electronic device as shown in Step 230, provided the condition according to Step 200 is not met.

Alternatively, if the electronic device is receiving power from the battery power supply, a determination is required as to whether the user has enabled at least one of two power saving modes to reduce power consumption by the electronic device. The first power mode to be checked is whether the hardware product is in "De-turbo mode" (Step 210). In De-turbo mode, the user selectively sets (in user setup) a desired operating frequency of the electronic device to be less than the maximum operating frequency. This can be performed in laptop computers by depressing a switch located on the computer. If the hardware product employing the electronic device is in De-turbo mode, the voltage and frequency of the electronic device is appropriately scaled as configured (Step 225).

However, if that hardware product is not configured to support the De-turbo mode, a second determination is made as to whether the user has enabled a second power saving mode referred to as a "Demand Non-Linear Throttling" ("DNLT") mode (Step 215). In this mode, if enabled by the user, software will transparently alter the voltage and frequency of the electronic device based on amount of idle time experienced by the electronic device (Step 225), provided the conditions associated with Steps 200 and 210 do not indicate the contrary. If the DNLT mode is disabled, no voltage and frequency scaling is performed. Otherwise, when DNLT mode is enabled and the electronic device is frequently experiencing idle time thereby indicating that the device is being utilized to its full capability, voltage and frequency scaling is performed on the electronic device until it is operating at its maximum capability (Steps 220, 225). In the event that the DNLT mode is enabled and the electronic device is operating at its full capability, no voltage and frequency scaling is performed on the electronic device (Steps 220, 230). This process is continued to monitor the electronic device to optimize its performance and especially reduce its power consumption.

The present invention described herein may be designed in many different embodiments evident to one skilled in the art than those described without departing from the spirit and scope of the present invention. The invention should, therefore, be measured in terms of the claims which follow.

What is claimed is:

1. A power control circuit adapted for use by an electronic device comprising:

a clock generation circuit that supplies a clock signal having a scalable frequency to the electronic device;

a power supply circuit that provides a power supply signal having a scalable voltage to the electronic device; and a controller coupled to said clock generator circuit and said power supply circuit, said controller generates a first and second signal in response to an event in order to dynamically control power usage by the electronic device, the power usage is capable of being (i) reduced by decreasing the frequency of the clock signal followed by the voltage of the power supply signal or (ii) increased by increasing the voltage followed by the frequency.

2. The power control circuit according to claim 1 further comprising a thermal detection circuit that monitors a temperature of the electronic device and outputs a third signal to said controller upon detecting said event.

3. The power control circuit according to claim 2, wherein said thermal detection circuit includes a temperature sensing device coupled to of the electronic device; and thermal comparison logic coupled to said temperature sensing device and said controller, said thermal comparison logic receives a signal from said temperature sensing device, compares said signal to a requisite temperature level and transfers said signal into said third signal which, when asserted, indicates that the electronic device has exceeded said thermal band.

4. The power control circuit according to claim 2, wherein said event detected by said thermal detection circuit includes a condition where the electronic device has exceeded a thermal band.

5. The power control circuit according to claim 1, wherein said controller includes a clock speed storage element to contain a frequency slewing constant used to regulate adjustment of the scalable frequency and a core voltage storage element to contain a voltage slewing constant used to regulate adjustment of the scalable voltage.

6. The power control circuit according to claim 1, wherein said clock generation circuit reduces the frequency of said scalable clock signal upon receiving said first signal.

7. The power control circuit according to claim 1, wherein said controller further detects whether the electronic device is idle for at least a predetermined percentage of its run time and in response outputs said first and second signals to commence frequency and voltage scaling of the electronic device.

8. A power control circuit for an electronic device comprising:

clock means for scaling an operating frequency of a clock signal supplied to at least the electronic device;

power means for scaling a voltage supplied to the electronic device; and control means for at least detecting whether the electronic device is idle for a predetermined percentage of a run-time of said electronic device and for outputting a plurality of control signals to commence dynamic scaling of the operating frequency and voltage supplied to the electronic device when idle for at least said predetermined percentage of said run-time, said control means being coupled to said clock means and said power means.

9. The power control circuit according to claim 8, wherein said control means includes a clock speed storage element, a core voltage storage element and a halt cycle detect storage element.

10. The power control circuit according to claim 9, wherein said halt cycle detect storage element is a one-bit register.

11. The power control circuit according to claim 10, wherein said clock means reduces said operating frequency of said clock signal upon detecting said halt cycle detect storage element is set.

12. The power control circuit according to claim 8 further comprising thermal detection means for monitoring a temperature of the electronic device and for producing a signal when the electronic device has exceeded a thermal band.

13. The power control circuit according to claim 12, wherein said thermal detection means includes sensing means for sensing said temperature of the electronic device; and comparison means for receiving a temperature signal from said sensing means and for digitizing said temperature signal into said signal which, when asserted, indicates that the electronic device has exceeded said thermal band, said comparison means is coupled to said sensing means.

14. The power control circuit according to claim 13, wherein said clock means reduces said operating frequency of said clock signal supplied to the electronic device upon said thermal detection means asserting said signal.

15. The power control circuit according to claim 14, wherein said power supply means reduces said voltage supplied to the electronic device after said operating frequency of said clock signal has been reduced.

16. A computer system comprising:

a processor; and a power control circuit coupled to the processor, the power control circuit including a clock generation circuit that supplies a clock signal having a scalable frequency to said processor in response to a first signal, a power supply circuit that provides a power supply signal having a scalable voltage to said processor in response to a second signal, and a controller coupled to said clock generation circuit and said power supply circuit, said controller generates said first and second signal in response to an event in order to dynamically control power usage by said processor, the power usage is capable of being either incrementally increased or decreased in order to obtain a desired tradeoff between performance and power usage by the processor.

17. The computer system according to claim 16, wherein said power control circuit further comprises a thermal detection circuit that monitors a temperature of the electronic device and out-puts a third signal to said controller upon detecting said event.

18. The computer system according to claim 17, wherein said event detected by said thermal detection circuit of said power control circuit includes a condition where the electronic device has exceeded a thermal band.

19. The computer system according to claim 18, wherein said thermal detection circuit of said power control circuit includes
   a temperature sensing device coupled to said processor; and
   thermal comparison logic coupled to said temperature sensing device and said controller, said thermal comparison logic receives a signal from said temperature sensing device, compares said signal to ascertain whether said processor has exceeded the thermal band, and transmits said third signal in an asserted state to indicate that said processor has exceeded said thermal band.

20. The computer system according to claim 16, wherein said controller of said power control circuit includes a clock speed storage element and a core voltage storage element.

21. The computer system according to claim 16, wherein said clock generation circuit reduces the frequency of the clock signal upon receiving said first signal.

22. The computer system according to claim 21, wherein said power supply circuit reduces said scalable voltage provided through said power supply signal upon receiving said second signal.

23. The computer system according to claim 16, wherein said controller of said power control circuit further detects whether said processor is idle for at least a predetermined percentage of its run time and in response outputs said first and second signals to commence dynamic frequency and voltage scaling of said processor.

24. A computer system comprising
   processor means for processing information;
   bus means for transferring said information internally within the computer system;
   system control means for transferring said information between said processor means and said bus means, said system control means is coupled to said processor means and said bus means; and
   power control means for reducing power consumption by at least said processor, said power control means includes
      clock means for scaling an operating frequency of a clock signal supplied to at least said processor means,
      power means for scaling a voltage provided to said processor means, and
      control means for at least detecting whether the electronic device is idle for a predetermined percentage of a run-time of said electronic device and for outputting a plurality of control signals to commence frequency and voltage scaling of the processor means when idle for at least said predetermined percentage of said run-time, said control means being coupled to said clock means and said power means.

25. The computer system according to claim 24, wherein said control means of said power control means of said power control means includes a clock speed storage element, a core voltage storage element and a halt cycle detect storage element.

26. The computer system according to claim 24, wherein said power control means further comprises thermal detection means for monitoring a temperature of said processor means and for producing a signal when said processor means has exceeded a thermal band.

27. The computer system according to claim 26, wherein said thermal detection means of said power control means includes sensing means for sensing said temperature of said processor means; and
comparison means for receiving a temperature signal from said sensing means and for digitizing said temperature signal into said signal which, when asserted, indicates that said processor means has exceeded said thermal band, said comparison means is coupled to said sensing means.

28. The computer system according to claim 27, wherein said clock means reduces operating frequency of said clock signal upon said thermal detection means asserting said signal.

29. The computer system according to claim 28, wherein said power supply means reduces said voltage supplied to said processor means after said operating frequency of said clock signal.

30. A method to control power consumption by an electronic device, the method comprising the steps of:
   determining whether a first condition exists which requires power consumption by the electronic device to be reduced;
   scaling an operating frequency of a clocking signal supplied to the electronic device if said first condition exists; and
   scaling a voltage supplied to the electronic device subsequent to scaling the operating frequency if said first condition exists.

31. The method according to claim 30, wherein said step of determining whether said first condition exists includes the step of determining whether the electronic device is operating at a temperature greater than a specific thermal band.

32. The method according to claim 31, wherein the method further comprises the step of
   determining whether the electronic device is coupled to one of a battery source and a power outlet, wherein
      if the electronic device is coupled to said battery source,
         determining whether the electronic device is experiencing at least a predetermined percentage of idle time compared to a run-time of the electronic device,
         scaling said operating frequency of said clocking signal supplied to the electronic device if the electronic device is experiencing at least said predetermined percentage of idle time, and
         scaling said voltage supplied to the electronic device if the electronic device is experiencing at least said predetermined percentage of idle time, and
      if the electronic device is coupled to said power outlet, operating the electronic device at said operating frequency and said voltage.

33. A method to control power consumption and performance of an electronic device, the method comprising the steps of:
   determining whether a first condition exists which for an increase in increased power usage by the electronic device in order to increase performance of the electronic device;
   increasing a voltage supplied to the electronic device if the first condition exists; and
   increasing an operating frequency of a clocking signal supplied to the electronic device after an increase in the voltage if the first condition exists.

* * * * *